US005259633A

United States Patent [19]

Sonnendorfer et al.

[11] Patent Number: 5,259,633

[45] Date of Patent: Nov. 9, 1993

[54] TRANSPORT CART WITH COIN-OPERATED LOCK

[75] Inventors: Horst Sonnendorfer; Franz Wieth, both of Eichenau, Fed. Rep. of Germany

[73] Assignee: Systec Ausbausysteme GmbH, Eichenau, Fed. Rep. of Germany

[21] Appl. No.: 889,563

[22] Filed: May 28, 1992

[30] Foreign Application Priority Data

Jun. 6, 1991 [DE] Fed. Rep. of Germany ....... 4118514

[51] Int. Cl.[5] ........................ B62D 39/00; G07F 5/02; G07F 17/10

[52] U.S. Cl. ................................ 280/33.994; 194/905

[58] Field of Search ...................... 280/33.992, 33.994; 194/205, 212, 905; 70/389, DIG. 41; 403/108, 327, 328

[56] References Cited

U.S. PATENT DOCUMENTS

| | | | |
|---|---|---|---|
| 4,371,070 | 2/1983 | Maxwell . | |
| 4,474,282 | 10/1984 | Lenander | 194/905 X |
| 4,513,983 | 4/1985 | Calder | 280/33.992 |
| 4,573,564 | 3/1986 | Rheeder et al. | 194/905 X |
| 4,683,609 | 8/1987 | Trubiano . | |
| 4,773,660 | 9/1988 | Trubiano | 280/33.994 |

FOREIGN PATENT DOCUMENTS

| | | | |
|---|---|---|---|
| 0199274 | 10/1986 | European Pat. Off. | 194/205 |
| 0286460 | 10/1988 | European Pat. Off. . | |
| 0384855 | 8/1990 | European Pat. Off. | 280/33.992 |
| 400803 | 9/1923 | Fed. Rep. of Germany . | |
| 2554916 | 6/1977 | Fed. Rep. of Germany . | |
| 2900367 | 7/1979 | Fed. Rep. of Germany . | |
| 3324962 | 8/1984 | Fed. Rep. of Germany . | |
| 3317656 | 11/1984 | Fed. Rep. of Germany . | |
| 3714115 | 11/1988 | Fed. Rep. of Germany | 194/905 |
| 3743757 | 7/1989 | Fed. Rep. of Germany . | |
| 3902242 | 8/1990 | Fed. Rep. of Germany | 194/905 |

*Primary Examiner*—Brian Johnson

*Attorney, Agent, or Firm*—Edwin E. Greigg; Ronald E. Greigg

[57] ABSTRACT

A transport cart with a coin-operated lock. A connection between the coin-operated lock and an associated carrier arm permits an automatic coin mechanism to be pivoted relative to the plane of insertion of a key about an axis of rotation parallel to the handle of the transport cart and is secured at various angles of inclination relative to the handle.

10 Claims, 4 Drawing Sheets

TRANSPORT CART WITH COIN-OPERATED LOCK

RELATED PATENT APPLICATION

This application is related to application Ser. No. 07/862,700 filed Apr. 3, 1992 and now abandoned.

1. Field of Invention

The invention relates to a transport cart, especially a shopping trolley, which can be pushed into a similar cart and is equipped with a device suitable for the reception of goods, in general in the form of a basket, and with a handle, mounted on lateral carrier arms through end handle caps for driving the vehicle, wherein in the vicinity of the handle the cart comprises a coin-operated lock and a key for joining together the trolleys standing in a parked column and for releasing the trolley preferably from the end of the parked column on insertion of a deposit coin, where the coin-operated lock locks the deposit coin on release of the trolley and frees it on re-attachment of the trolley.

2. Related Prim Art

Transport carts with this deposit system have become known in principle from DE-A-2 554 916 and have since come on the market in different constructional forms. Since the release of a trolley is possible only against insertion of a deposit coin into the coin device and the user receives the coin back again only when he couples the trolley to one of the various collection points again, the trolleys no longer stand around uselessly. There is the saving of personnel for searching for, collecting and bringing back the trolleys and also one manages with a smaller number, because the trolleys not in use are always concentrated at the points where they are needed.

In most trolleys the coin-operated lock is fitted on the handle tube with which the trolley can be propelled, see DE-A-2 900 367 and U.S. Pat. No. 4,683,609. However, this arrangement has the disadvantage that the accessibility of the basket is impaired. Furthermore, the coin-operated lock in shopping trolleys equipped with a child's seat extends into the seat region in an obstructive manner. Finally, with this positioning there is also the danger that the coin-operated locks may be twisted about the axis of the handle.

Moreover, it is known from DE-A-3 324 962 to secure the coin-operated lock externally on a side wall of the basket. However, the danger then exists that one can be caught by the laterally projecting lock housing, especially when there is traffic in two directions, because then the coin devices protrude on the basket sides facing one another. This increased safety interval is not normally expected by customers so that collisions frequently occur in the sometimes narrow aisles in supermarkets.

In order to eliminate these problems, it has been proposed in EP 199 274 to arrange the coin-operated lock in the transition region between the handle and the carrier arm, where it should be supported both on the handle and on the carrier arm, so that wilful twisting is precluded.

However, fitting the lock in this region demands a precisely dimensioned matching of the housing of the coin-operated lock to the geometrical parameters of various parts. Depending on the cart manufacturers, different forms are on the market for the handle carrier arm, the handle cap, and especially for the inclination of the carrier arms, the known coin-operated lock must be adapted, by differently shaped housings, to the transport carts to be found on the market.

SUMMARY OF THE INVENTION

On this basis the task of the present invention consists in improving the transport cart as initially described such that it is distinguished by universal suitability for different cart types. Moreover, the accessibility of the basket for loading and unloading and also the suitability for a child's seat, if needed, are to be preserved. Finally, according to a further development of the invention, the coin-operated lock is to be so stable that one can propel a column of coupled-together trolleys not only forwardly, which is not critical, but also rearwardly, by pulling the last trolley of the column. In that action the traction forces are transmitted in each case by way of the coin-operated lock from the one trolley to the other, so that the coin-operated locks are exposed to high traction loading.

This complex task is solved in accordance with the invention in that the connection of the coin-operated lock with the one carrier arm of the trolley is pivotable relative to an axis of rotation parallel to the handle, and can be fixed at different angles of inclination of the coin-operated lock.

Thus the coin-operated lock always manages to be oriented horizontally irrespective of the inclination of the trolley carrier arms. Thus one can use the same housing design of the coin-operated lock for different types of shopping trolleys, only one injection molding mold is needed and thus one achieves considerably more favorable production costs than hitherto.

Moreover, the pivotable arrangement of the coin-operated lock permits a very precise orientation, relative to the tractive loads arising on driving a column of trolleys reversely in a manner such that the lock and especially the key part pushed into it are subject to pure tractive loads. Thus distortion of the key, which occurred hitherto by reason of obliquely acting forces, is precluded and at the same time the locking elements of the coin-operated lock in engagement with the key are preserved.

Various possibilities present themselves to the person skilled with the art for the pivotable arrangement of the coin lock and its fixing at the desired angle of inclination irrespective of the oblique positioning of its carrier arm. It is especially expedient if the connection of the coin-operated lock with its carrier arm takes place through a reception device to which the coin lock can be fixed at different angles of inclination relative to the axis of rotation parallel to the handle.

Here the possibility exists that the reception device comprises a real pivot mounting for the coin-operated lock, whereby its orientation and fitting are especially made easier. The arresting of the coin-operated lock at the desired angle of inclination can take place mechanically by push-in bolts, screws or the like. Instead however it is also advantageous if this arresting is effected by a resilient detent connection between the coin-operated lock and the reception device.

For simple fitting of the coin-operated lock and also for the use of the same reception device for coin-operated locks of different currencies, it is advisable to form the coin-operated lock as an exchangeable plug-in element. Then the reception device can always have the same form and will be integrated optimally into the handle cap arranged on the end of the carrier arm, that is, it is produced in one operation as a one-piece injection molding with the handle cap.

According to an especially advantageous further development of the invention, for which independent protection is claimed, the reception device comprises an opening of a jaw form into which the coin-operated lock can be inserted in an approximately horizontal direction and arrested. Thus the use of the reception device for coin-operated locks of different coins and also the orientation of the coin-operated lock to the desired angle of inclination are especially facilitated.

In order to render the reception device suitable for accommodating high traction forces, the opening of jaw form is oriented oppositely to the direction of travel of the trolley. The traction forces acting on the lock are then taken up not only positively but also in a dovetail manner by the reception device, and likewise the transmission of these traction forces from the reception device to the trolley carrier arm also takes place not only in a positively coupled manner but also in a shape-locking manner because the reception device is connected with the handle cap, grasping the end of the carrier arm.

In order to facilitate the insertion of the deposit coin or coins into the automatic coin device, the reception device comprises a corresponding aperture on one side wall or both side walls of the opening of a jaw form.

It is further advisable for the automatic coin device to comprise, at least in its region pushed into the reception device, a periphery which is approximately rotationally symmetrical, especially a circular or polygonal cylinder, and to correspond with appropriate neighboring surfaces in the interior of the opening of a jaw form. Thus it can easily be oriented and arrested in different angles of inclination.

The fitting of the coin-operated lock becomes especially easy if the opening of a jaw form can be opened resiliently in such a way that the automatic coin device can be inserted approximately horizontally into the jaw-shaped opening and engage approximately horizontally therein. This snap connection suffices for the arresting of the coin lock, because the jaw-shaped opening is open against any traction forces acting on the coin-operated lock, so that the snap connection is not loaded in the opening direction by these traction forces, but rather the lock is forced by these traction forces into the jaw-shaped opening.

The jaw-shaped opening is to be selected, as regards its vertical opening width, so that the coin-operated lock can be installed at all practically occurring angles of inclination and yet always remains accessible for the deposit coins to be inserted. Correspondingly the slot for the insertion of the key must also have a sufficiently great vertical extent at the circumferential region of the reception device opposite to the jaw-shaped opening.

BRIEF DESCRIPTION OF THE DRAWINGS

Further features and advantages of the invention appear from the following description of a preferred embodiment with reference to the drawings, wherein.

DESCRIPTION OF THE PREFERRED EMBODIMENT

Figure 1:
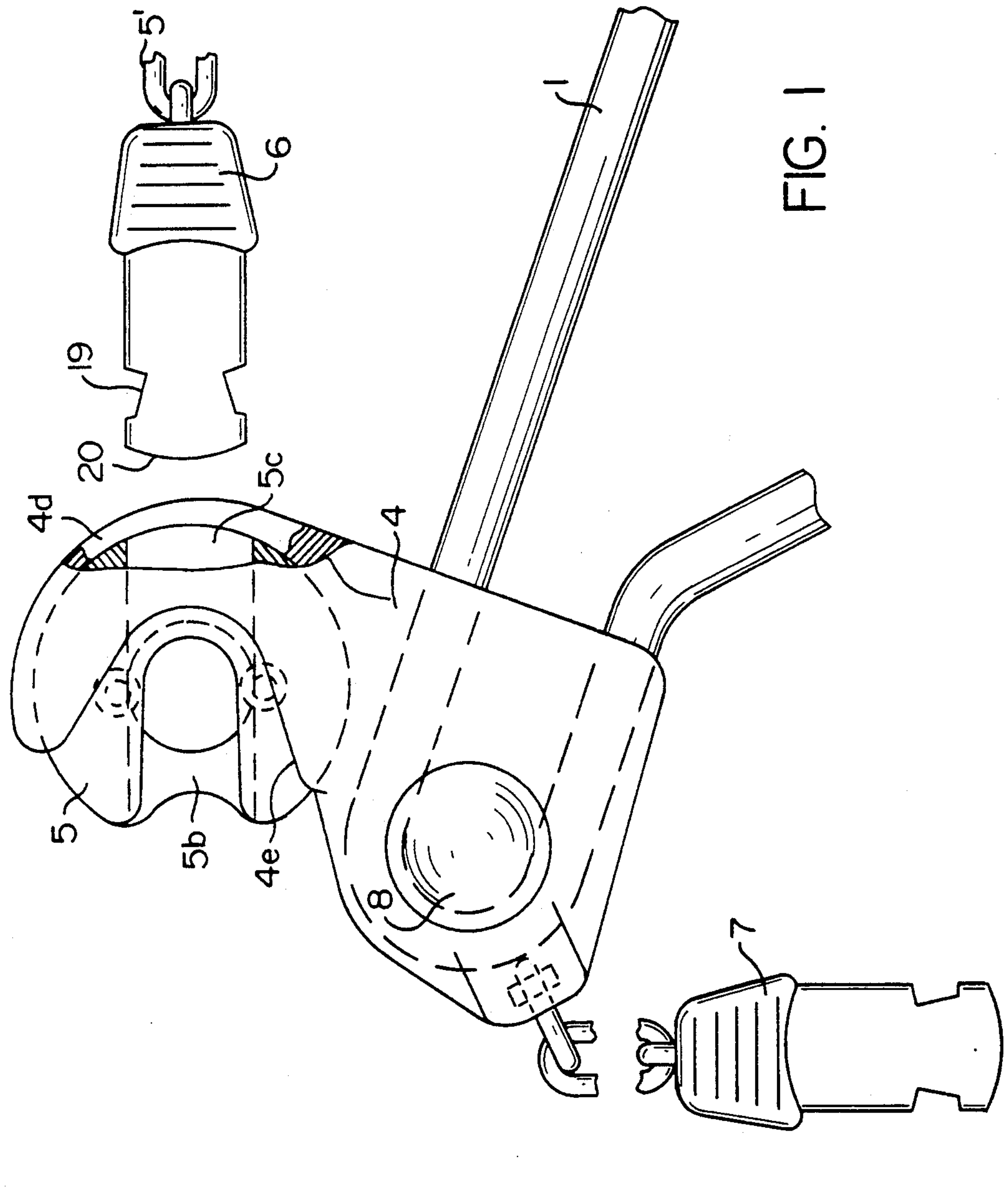
FIG. 1 shows in lateral elevation a part of the carrier arm of a shopping trolley, to which the handle as well as the coin-operated lock and the key are secured.
Figure 3:
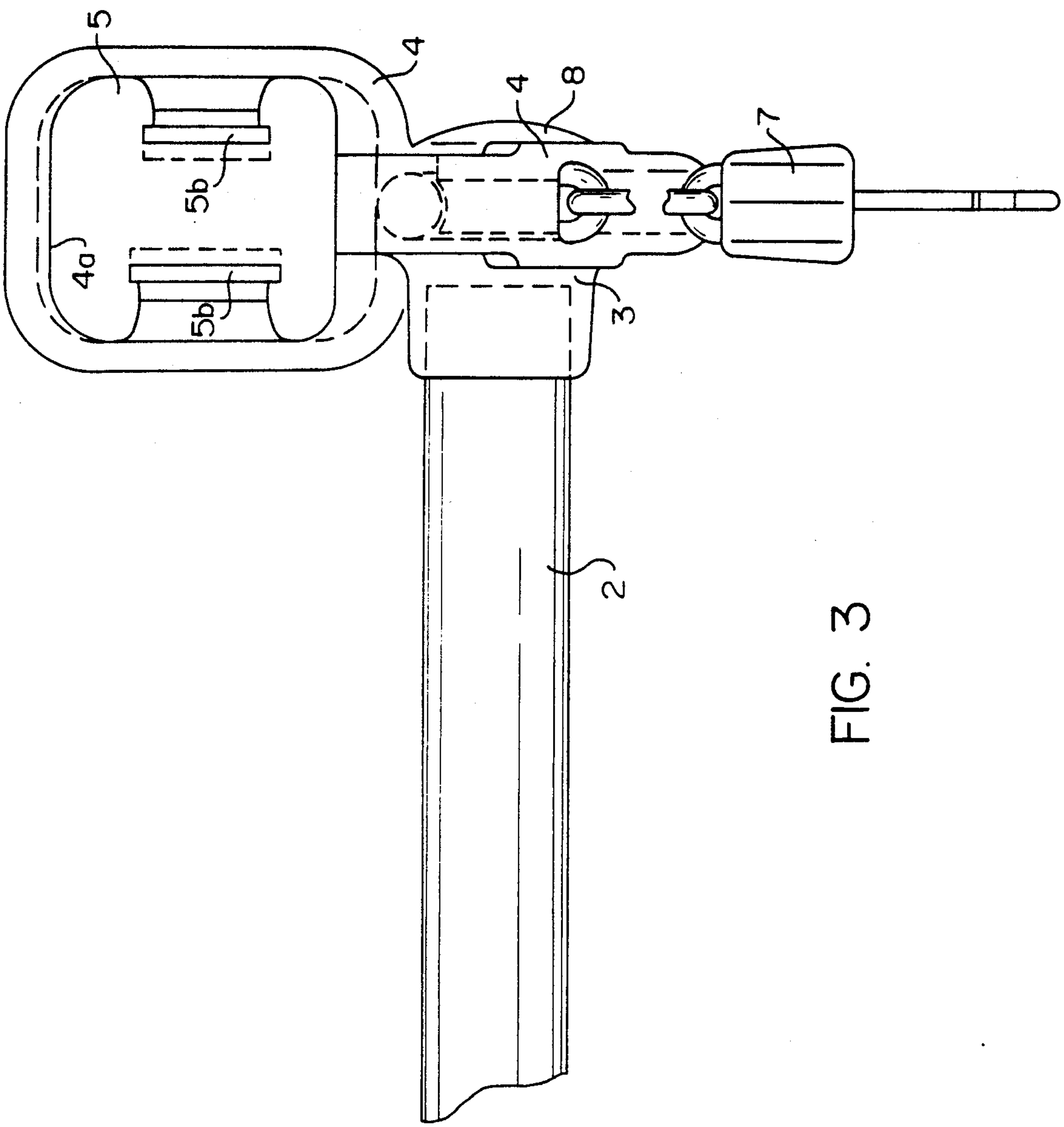
FIG. 3 shows the same region of the shopping trolley, seen from the rear in the direction of travel.
Figure 4:
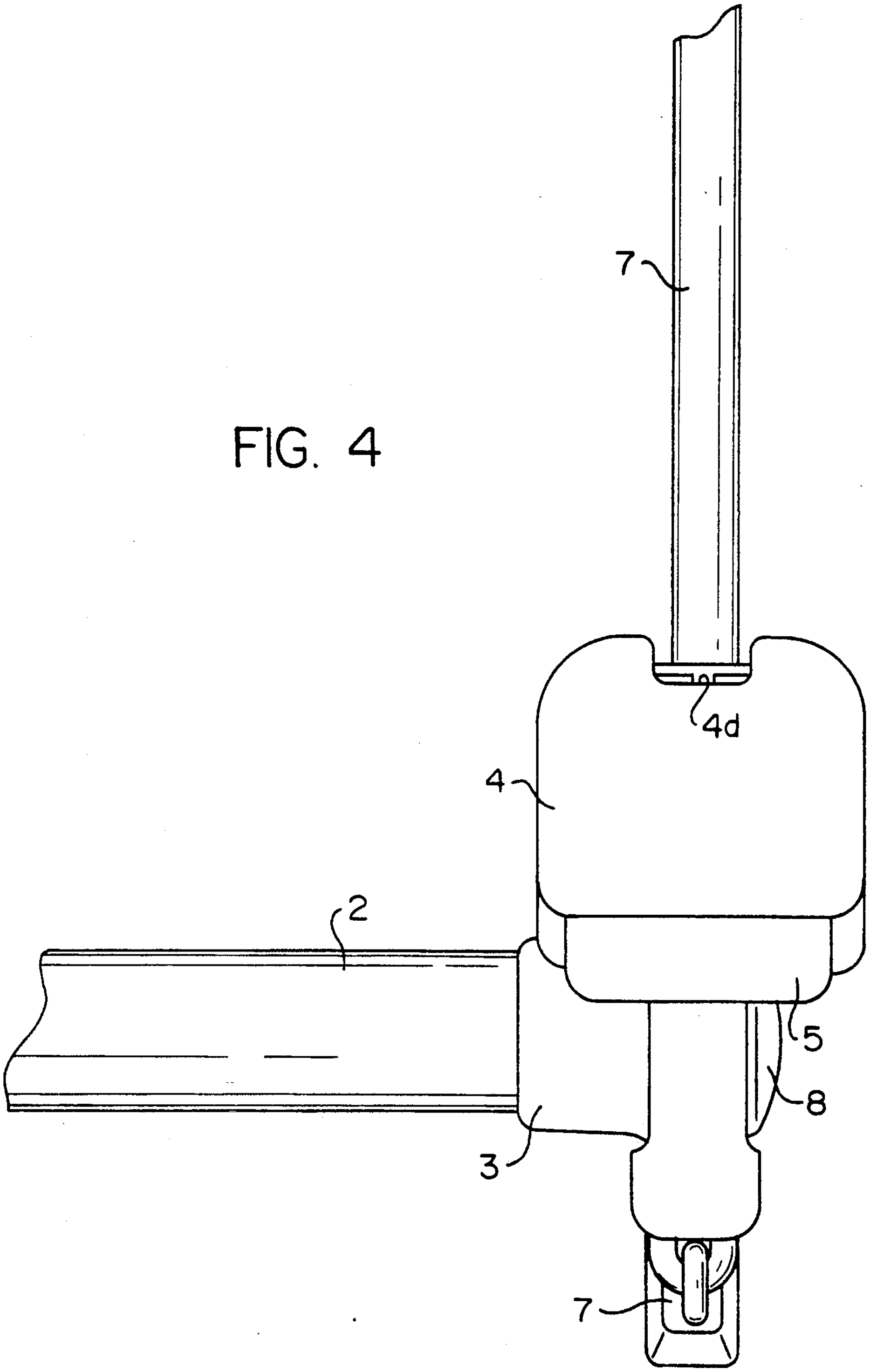
FIG. 4 shows the same region of the shopping trolley as FIG. 3, but seen from above.

In FIG. 1 one sees firstly an ordinary carrier arm 1 of a shopping trolley. Such a carrier arm runs on both sides of the trolley rising obliquely to the rear and there carries a handle tube 2 which is secured at each of its two ends in the U-shaped bend at the end of each carrier arm. This fastening is effected by means of a handle cap of synthetic plastics material which is pushed with a socket on to the U-shaped bend and comprises a horizontally inwardly extending bush 3 into which the handle tube 2 is pushed axially, see FIG. 3.

The fixing of the handle cap on the carrier arm 1 takes place by means of a pin 8 which is inserted from the exterior into an opening of the handle cap and engaged therein. It traverses through the U-shaped bend and thus holds the handle cap in a shape-locking (dovetail) manner fast on the carrier arm. Of course another fastening is also possible.

On the opposite carrier arm, which is not visible in the drawing, the handle tube 2 can be connected with the carrier arm by a handle cap of conventional form.

Figure 2:
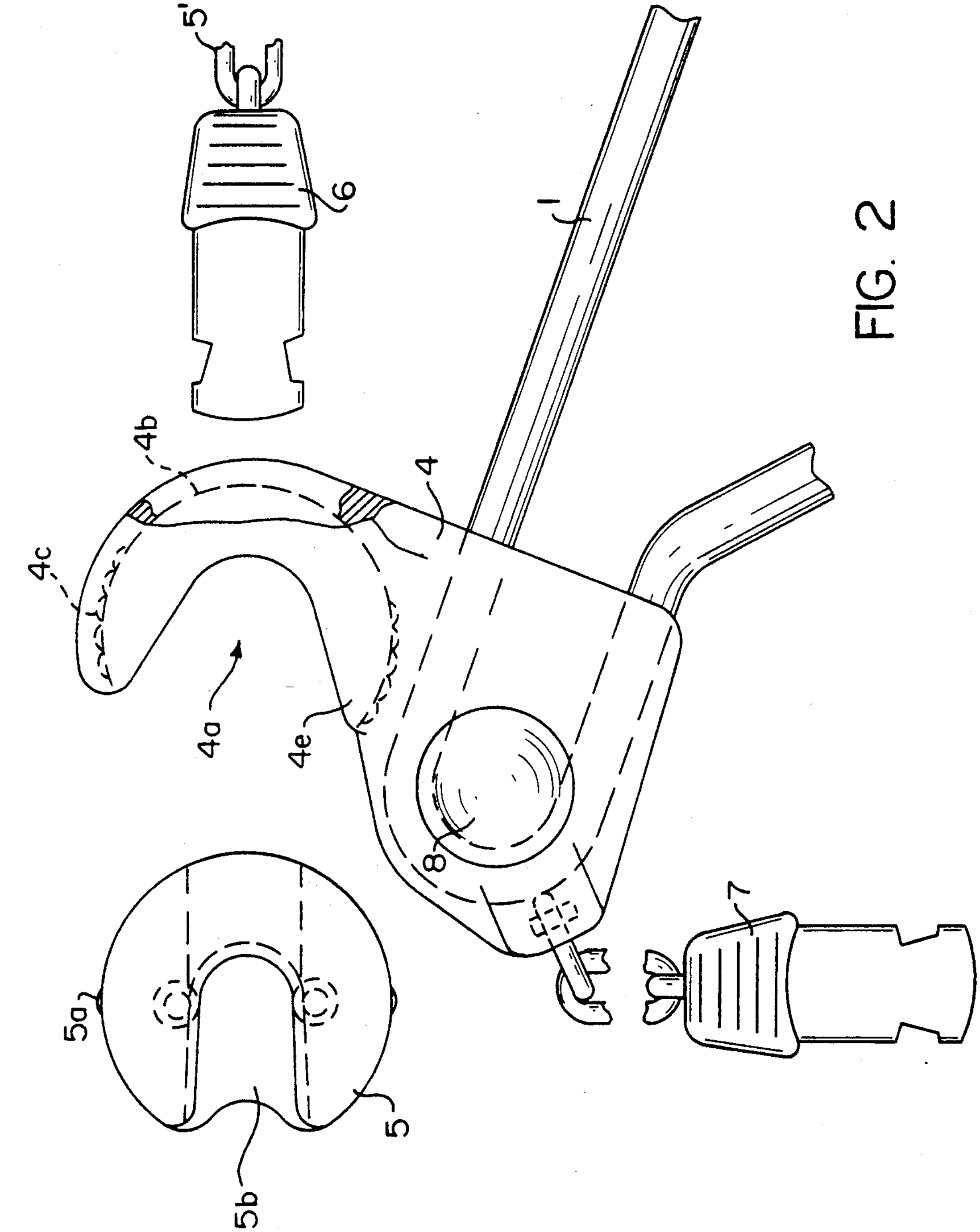
FIG. 2 shows the same lateral elevation as FIG. 1, with the coin-operated lock withdrawn from the reception device.

Now it is essential that the one handle cap is formed as a reception device 4 for the adjustable fitting of a coin-operated lock 5. For this purpose the upper region of the reception device 4 is of a somewhat C-shaped form and is open to the rear, that is oppositely to the direction of travel. The jaw-shaped opening 4*a* thus produced can be seen especially in FIG. 3. The coin-operated lock 5 can be pressed approximately horizontally into this opening, under a resilient opening out of the C-shaped upper part of the reception device 4, and clamped therein, see FIGS. 1 and 2.

In order to assure, on the one hand, secure retention of the coin-operated lock 5 in the reception device 4 and on the other hand the desired adjustability of the coin-operated lock relative to an axis of rotation parallel to the handle 2, the cavity behind the opening 4*a* has a right cylindrical contour 4*b* with an axis parallel to the handle 2, and is further provided with a plurality of adjacently disposed, longitudinal ribs 4*c*.

To this corresponds the external contour of the coin-operated lock 5. Thus it has substantially the form of a cylinder with a horizontal axis. Its outside is provided with ribs 5*a* which co-operate with the longitudinal ribs 4*c* of the reception device.

The coin-operated lock 5 is of such a configuration that on both sides of a deposit coin, or two deposit coins standing on edge, can be inserted forwardly by way of appropriate, somewhat horizontally extending slots 5*b*. The coin-operated lock has a slot 5*c* (see FIG. 1) on the opposite side facing in the direction of travel into which the key 6 secured to a chain 5' of the preceding shopping trolley can be inserted.

Reference is made to PCT/EP 91/00 261, in respect of the design details of the coin-operated lock in which the coin-operated lock as represented here is described in greater detail. Of course, it is instead possible to use any other lock design.

The opening width of the jaw-shaped opening 4*a* for the insertion of the coin lock 5 and also the height of the opposite slot 4*d* for the key 6, which is preferably to be inserted front edge first are so dimensioned that the accessibility of the coin-operated lock 5 is preserved under all practically occurring angle differences between the plane of insertion of the key 6 into the lock 5 for the one part and the carrier arm 1 for the other part. For the same purpose the vertical side walls 4*e* of the reception device are also cut out and furthermore are kept so narrow that the deposit coins pushed into the coin lock always remain visible.

Furthermore, the dimensions of the jaw-shaped reception opening 4*a*, on the one hand, and of the coin-operated lock 5 on the other, are so selected that the coin-operated lock, under resilient widening out of the reception device 4, can be snapped into engagement in the latter.

Finally, it will be clear from FIG. 1 that with traction loading of the key 6 locked in the coin-operated lock, the coin-operated lock 5 is pressed into the jaw-shaped opening 4*a* of the reception device and that likewise the lower region of the reception device, which grasps as an end cap over the carrier arm 1, is pressed against this carrier arm. Thus in both connections the traction loading is transmitted by complementary shape engagement. This is also true in the case of oppositely directed forces, that is, when for example a pull is exerted on the key 7 pertaining to the carrier arm 1, for in this case it is the pin 8 which transmits the traction force in a positively coupled manner to the carrier arm 1, while the coin-operated lock 5 is again pressed as before into the jaw-shaped opening of the reception device 4.

Thus one obtains a very stable and compact attachment of the coin-operated lock to the shopping trolley with the special advantage that the coin-operated lock can be oriented, independently of the angle of inclination of the carrier arm 1, as regards its insertion plane for the key, and thus can be used for different cart types.

We claim:

1. A coin-operated lock for locking a first transport cart to a coin-operated lock of a second transport cart aligned in a parked column with each other, in which each coin-operated lock includes a reception device fixed to a transport cart carrier arm, said reception device includes a C-shaped portion having a passage therein with an opening to a rear portion, a coin-operated lock element which fits into said passage and provided with means for a pivot mounting so as to be fixable to said reception device at different angles of inclination in relation to an axis of rotation, said reception device includes a key secured thereto, said key fits into a second coin-operated lock of said second transport cart to secure said first and second transport carts together, means for receiving a coin in a second coin-operated lock element to release said key of said first coin-operated lock from said second coin-operated lock and for retaining said coin in said second coin-operated lock element until a key of said first coin-operated lock is reinserted into said second coin-operated lock.

2. A coin-operated lock for a transport cart according to claim 1, wherein said reception device includes a snap connection that holds said coin-operated lock at a desired angle of inclination in said reception device.

3. A coin-operated lock for a transport cart according to claim 1, wherein said coin-operated lock is an easily exchangeable plug-in element.

4. A coin-operated lock for a transport cart according to claim 1, wherein a handle cap is arranged on an end of said carrier arm and said reception device is formed in one piece on said handle cap.

5. A coin-operated lock for a transport cart according to claim 1, wherein said reception device has a jaw-shaped opening into which the coin-operated lock is inserted approximately horizontally and arrested by said-jaw-shaped opening.

6. A coin-operated lock for a transport cart according to claim 5, wherein said jaw-shaped opening is oriented in a direction opposite to a direction of travel of the cart.

7. A coin-operated lock for a transport cart according to claim 5, wherein said jaw-shaped opening has a side wall, and said reception device includes at least in said side wall an aperture for the insertion of a deposit coin into said coin-operated lock.

8. A coin-operated lock for a transport cart according to claim 5, wherein said coin-operated lock has an approximately rotationally symmetrical circumference at least in a region received in said reception device, which circumference corresponds with corresponding neighboring faces in an interior of said jaw-shaped opening.

9. A coin-operated lock for a transport cart according to claim 5, wherein said jaw-shaped opening is resiliently expandable to release said key.

10. A coin-operated lock for a transport cart according to claim 5, wherein said reception device has a slot for the insertion of said key in a circumferential region lying opposite to said jaw-shaped opening.

* * * * *